3,448,098
PRODUCTION OF GUANYLIC ACID
Walter A. Gaines, Rahway, and Donald F. Reinhold, North Plainfield, N.J., assignors to Merck & Co., Inc., Rahway, N.J., a corporation of New Jersey
No Drawing. Filed Sept. 27, 1966, Ser. No. 582,239
Int. Cl. C07d 51/52
U.S. Cl. 260—211.5     3 Claims

ABSTRACT OF THE DISCLOSURE

A process for preparing guanylic acid comprising phosphorylating 2',3'-O-alkylidene guanosine with tetrachloropyrophosphate in the presence of phosphorous oxychloride and hydrolyzing the reaction product with water.

This invention relates to an improvement in the process of preparing nucleoside-5'-monophosphates. More particularly, the invention relates to the preparation of guanosine-5'-phosphate.

One of the products of this process, guanosine-5'-phosphate, more commonly known as guanylic acid, in the form of its sodium salt is useful as a flavoring agent for foods, beverages and seasonings. The addition of small amounts of this guanylic acid or its salts greatly enhances the taste of various foods, beverages and seasonings.

In the process known to the art, a nucleoside-5'-monophosphate, for example, a 2',3'-O-alkylidene nucleoside such as 2',3'-O-isopropylidene guanosine is reacted with a large excess of tetrachloropyrophosphate to produce the corresponding dichlorophosphate, which on addition to water is hydrolyzed to guanylic acid.

Phosphoric acid is not readily separated from nucleoside-5'-monophosphates, for example, guanylic acid, by reason of its very similar physical and chemical characteristics. However, the separation may be achieved either by its extensive ion exchange chromatography oro by fractional crystallization of the salts of phosphoric acid and the nucleoside phosphate respectively, both being expensive and tedious processes.

The process of the present invention comprises reacting a 2',3'-O-alkylidene nucleoside, such as a 2',3'-O-alkylidene guanosine, wherein the alkylidene group may be isopropylidene, 2-butylidene or 3-pentylidene, with a small excess of tetrachloropyrophosphate in the presence of phosphorous oxychloride. It is known that phosphorous oxychloride will bring about a very small amount of phosphorylation of alkylidene guanosines, such as isopropylidene guanosine. However, the purpose of this substance in the present process is primarily to act as a solvent, which may be very readily removed after completion of the reaction. Thus, the amount of excess phosphoric acid which results on hydrolysis is held to a minimum.

In the preferred modification of the process, a slurry of the alkylidene guanosine, suitable isopropylidene guanosine in phosphorous oxychloride is cooled to a temperature of from about −5° C. to about +10° C., preferably to from about 0° C. to about 5° C., protected from moisture and treated with a small excess, for example, an excess of not more than one mole, suitably a 25% molar excess of tetrachloropyrophosphate. The reaction mixture is allowed to warm to ambient temperature, from about 15° C. to about 30° C., stirred for from about 1 to about 2 hours and evaporated under high vacuum at a temperature of less than 35° C. The residual oil is taken up in from 10 to 20 times its weight of water and shaken with a liquid anion exchange resin, suitably, Amberline LA-1 (manufactured by Rohm and Haas Co. of Philadelphia, Pa.) in an inert organic solvent, suitably, a high boiling hydrocarbon solvent. It is preferred to use 10 to 15 molar equivalents of resin based on isopropylidene guanosine used. The organic layer is retained and the resin regenerated with caustic. The guanylic acid is then isolated from the aqueous layer.

In the preferred method of isolation, the guanylic acid is isolated in the form of the guanylic acid dioxanate which may be readily decomposed to yield the free guanylic acid. Alternatively, the dioxanate may be dissolved in water and one equivalent of a metal base, suitably an alkali or alkaline earth metal base, such as sodium carbonate, potassium hydroxide, calcium carbonate or magnesium bicarbonate added thereto. The water/dioxane mixture is then removed by evaporation under reduced pressure to yield the corresponding acid salt.

In the preferred isolation procedure, the aqueous layer is diluted with an equal volume of dioxane cooled to about 0° C. to about 5° C. and allowed to remain at this temperature for from about 12 to about 18 hours. The guanylic acid dioxanate is then found ot separate as a crystalline precipitate and is filtered and dried.

The following examples illustrate methods of carrying out the present invention but it is to be understood that these examples are given for the purposes of illustration and not of limitation.

EXAMPLE I

To a stirred slurry of 5.00 g. 2',3'-O-isopropylidene guanosine in 30 ml. phosphorous oxychloride at 0° C. to 5° C., protected from moisture, is added 2.8 ml. tetrachloropyrophosphate. The cooling bath is removed and stirring continued for 45 minutes. The solvent is evaporated in high vacuum below 35° C. and the residue, 13.14 g. of viscous oil, is taken up in 160 ml. cold water. The solution is shaken for two minutes with a solution of 56.2 g. LA-1 Amberlite liquid anion exchange resin in 150 ml. Esso solvent WS 4215. Emulsions are formed, but disappear quickly on standing in 2–3 minutes. The aqueous layer containing the guanylic acid is then separated from the organic layer and the guanylic acid isolated as guanylic acid dioxanate.

The aqueous layer is diluted with an equal volume of dioxane and left for 12 hours at 5° C. A crystalline precipitate forms, is filtered, washed twice with dioxane and dried at 0.1 mm. at 45° C. to constant weight to yield guanylic acid dioxanate.

In accordance with the above procdure but starting with 2',3'-O-isopropylidene, 2'3'-O-2-butylidene guanosine, or 2',3'-O-3-pentylidene guanosine, in place of 2',3'-O-isopropylidene guanosine, there is produced the corresponding guanosine-5'-monophosphate dioxanate.

What is claimed is:
1. A process for the preparation of guanosine-5'-monophosphate which comprises reacting a 2',3'-O-alkylidene guanosine wherein the alkylidene is isopropylidene, 2-butylidene or 3-pentylidene with 1 to 2 molar equivalents of tetrachloropyrophosphate per mole of 2',3'-O-alkylidene guanosine in the presence of phosphorous ox- ychloride, evaporating the resulting reaction mixture under vacuum, hydrolyzing the evaporated mixture with water, and recovering said guanosine-5'-monophosphate from the aqueous solution.

2. A process according to claim 1 wherein the amount of tetrachloropyrophosphate used is 1 to 1.25 molar equivalents per mole of nucleoside.

3. A process according to claim 1 wherein the alkylidene group is isopropylidene.

References Cited

UNITED STATES PATENTS

| 3,201,389 | 8/1965 | Fujimoto et al. | 260—211.5 |
| 3,282,920 | 11/1966 | Ouchi et al. | 260—211.5 |
| 3,290,285 | 12/1966 | Senoo et al. | 260—211.5 |

LEWIS GOTTS, *Primary Examiner.*

JOHNNIE R. BROWN, *Assistant Examiner.*